United States Patent
Hasselback et al.

(10) Patent No.: US 9,879,467 B2
(45) Date of Patent: Jan. 30, 2018

(54) SECURE ACCESS MIRROR

(71) Applicant: MirrorCache LLC, Seattle, WA (US)

(72) Inventors: Frederick William Hasselback, Seattle, WA (US); Scott Thomas Ware, Seattle, WA (US)

(73) Assignee: MIRRORCACHE LLC, Seattle, WA (US)

( * ) Notice: Subject to any disclaimer, the term of this patent is extended or adjusted under 35 U.S.C. 154(b) by 141 days.

(21) Appl. No.: 14/708,148

(22) Filed: May 8, 2015

(65) Prior Publication Data

US 2015/0320209 A1    Nov. 12, 2015

Related U.S. Application Data

(60) Provisional application No. 61/991,393, filed on May 9, 2014.

(51) Int. Cl.

| | |
|---|---|
| E05G 1/04 | (2006.01) |
| E05G 1/026 | (2006.01) |
| A47B 95/00 | (2006.01) |
| E05B 49/00 | (2006.01) |
| H04N 5/225 | (2006.01) |
| H04N 7/18 | (2006.01) |
| G06K 9/00 | (2006.01) |
| E05G 1/10 | (2006.01) |
| A47B 81/00 | (2006.01) |
| A47B 67/00 | (2006.01) |

(52) U.S. Cl.
CPC ............... *E05G 1/04* (2013.01); *A47B 95/00* (2013.01); *E05B 49/00* (2013.01); *E05G 1/026* (2013.01); *G06K 9/00221* (2013.01); *H04N 5/2251* (2013.01); *H04N 5/2252* (2013.01); *H04N 5/2257* (2013.01); *H04N 7/188* (2013.01); *A47B 67/005* (2013.01); *A47B 81/00* (2013.01); *A47B 2220/0061* (2013.01); *A47B 2220/0075* (2013.01); *Y10T 70/7068* (2015.04)

(58) Field of Classification Search
CPC ....... A47B 67/005; A47B 81/00; E05G 1/026; G02B 6/0095; G06K 9/00221; G07C 9/00087; H04N 7/188; Y10T 70/7068
See application file for complete search history.

(56) References Cited

U.S. PATENT DOCUMENTS 9,145,728 B1 * 9/2015 LeBlanc ............... E05G 1/10
2002/0080494 A1    6/2002 Meine
(Continued)

FOREIGN PATENT DOCUMENTS

AT    381976 B    12/1986

OTHER PUBLICATIONS

International Patent Application No. PCT/US2015/30036; Int'l Search Report and the Written Opinion; dated Aug. 11, 2015; 20 pages.

*Primary Examiner* — Obafemi Sosanya
(74) *Attorney, Agent, or Firm* — Baker & Hostetler LLP

(57) ABSTRACT

A discreet mirrored cabinet is disclosed. Items can be secured inside by a locking mechanism, and security is enhanced by concealing the locked cabinet behind a mirror. The cabinet may include additional features such as an automated camera for capturing images when items are added or removed from the cabinet, and electric power can be provided to, for example, charge electronic device while they are securely stored in the locked cabinet.

15 Claims, 6 Drawing Sheets

(56) References Cited

U.S. PATENT DOCUMENTS

| | | | |
|---|---|---|---|
| 2003/0001724 A1 | 1/2003 | Willats et al. | |
| 2004/0140350 A1 | 7/2004 | Valencia et al. | |
| 2005/0190040 A1* | 9/2005 | Huntzicker | B60R 1/12 340/5.54 |
| 2006/0054754 A1 | 3/2006 | Liberman et al. | |
| 2006/0237427 A1* | 10/2006 | Logan | E05B 47/0002 219/401 |
| 2007/0057606 A1* | 3/2007 | Christian | A45C 11/16 312/245 |
| 2007/0069908 A1* | 3/2007 | St-Germain | H05B 33/0842 340/686.1 |
| 2008/0245788 A1 | 10/2008 | Choong et al. | |
| 2009/0015121 A1 | 1/2009 | Sampson | |
| 2012/0042704 A1 | 2/2012 | Chang et al. | |
| 2014/0196636 A1* | 7/2014 | Deweese | E05G 1/04 109/23 |

\* cited by examiner

SECURE ACCESS MIRROR

CROSS REFERENCE TO RELATED APPLICATIONS

This application claims benefit under 35 U.S.C. §119(e) of Provisional U.S. Patent Application No. 61/991,393, filed May 9, 2014, the contents of which is incorporated herein by reference in its entirety.

TECHNICAL FIELD

This disclosure relates to lockable storage cabinets for hotels, cruise ships, or personal use.

BACKGROUND

Present day cabinetry allows for storage of personal items into a shelved space with access via an opened door. Present day construction of homes, condos, apartments, and hotels include room mirrors, and standard cabinetry and drawers for storage of personal items. There have been a growing number of concerns about how to keep personal belongings, prescription medications, and other small items/high value items secure from individuals who should not have access to them.

SUMMARY

This disclosure describes a locking cabinet comprising a shell having high-strength material and at least one aperture, and configured to contain at least one electronic device; a shell door attached to the shell and covering an aperture, and having high-strength material; a locking mechanism configured for locking the shell door closed; and a mirror mounted on the outside of the shell door. An electric power source may be included inside the shell and configured to provide electric power to the at least one electronic device when the shell door is closed. Additionally included may be at least one glass shelf lighted by a light-emitting diode (LED) light, and a keypad configured to accept a combination for locking or unlocking the locking mechanism. The keypad may be hidden by an outer mirrored door, or may be a mirror touch screen keypad that is hidden within the mirror when not activated. An electric power source inside the shell configured to provide electric power to the at least one electronic device when the shell door is closed.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
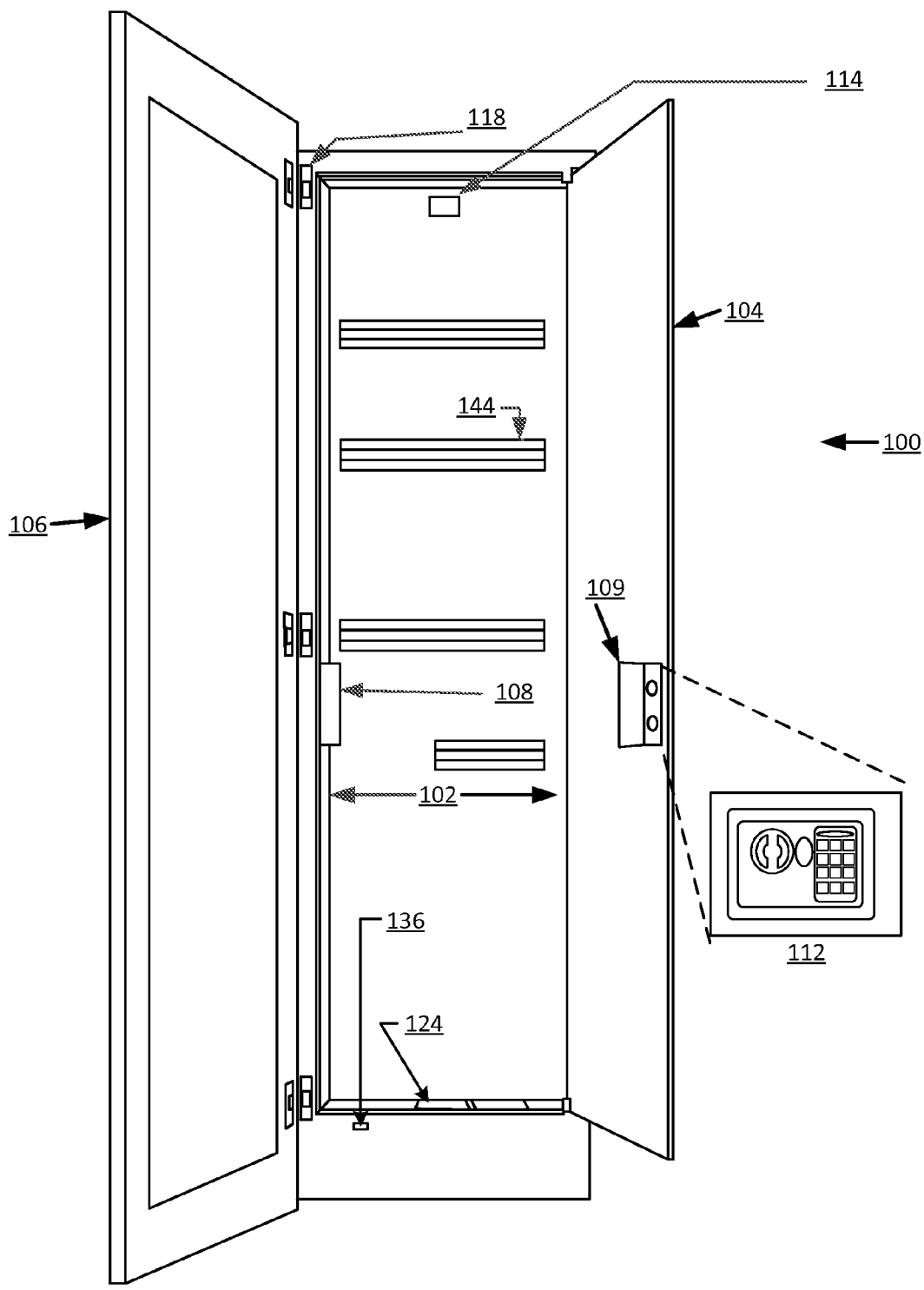
FIG. 1 is a three-dimensional view of an example secure access mirror.

Many homes, condos, apartments, and hotels do not have a locked and safe environment to store belongings, and there have been countless instances of children gaining access to parents' medications, houseguests stealing medications or belongings, and in the case of hotels, room cleaners stealing guests' belongings. This disclosure addresses some of these problems with apparatuses and methods of providing safe and secure storage of personal belongings but with quick and easy access storage. A secure access mirror (SAM) is a wall-mounted or recessed mirrored cabinet with shelving and storage space on the inside and a discrete or hidden touchpad locking mechanism that may be used to open the cabinet. A typical embodiment may include a cabinet configured to be mounted to a wall, where the entire front wall of the cabinet is a locking door with a mirror substantially covering the face of the door, and where the lock for the door is a keypad lock mounted somewhere on the side of the cabinet. Embodiments may provide an even more discrete location for the keypad and hence both provide additional security and enable a better aesthetic appearance, and embodiments can be more functional than a simple locking box.

The cabinet itself may have many different configurations. Example embodiments may include a cabinet with one or more storage compartments, and one or more locking doors. It may have a single compartment or multiple compartments of different shapes for different types of contents. For example, a small compartment may store jewelry and wallets, a medium-sized compartment may store cell phones and personal electronics, and a larger compartment may store and charge a personal computer. The interior compartment may be modular, such that space allocation (or other features such as charging plugs) can be moved, replaced, or sized as usage needs change, without having to mount a whole new cabinet. Interior compartments may include the ability to charge electronic devices with an interior-mounted house wall socket (e.g., 100 volts), a USB plug, a micro-USB plug, or an wireless charging pad (for example, for inductive or resonant charging).

The cabinet may be mounted on an existing wall, or recessed and inset into a wall to hide the depth of the cabinet. The cabinet may be configured to be mounted as a full-length mirror, for example, for a bedroom or closet, or it may be a vanity mirror mounted above a sink in a bathroom. It can, of course, be mounted anywhere else to provide easy access to discreet and secure storage, such as in the back wall of a closet, or as a small mirror near a front door to a dwelling.

Embodiments may be disguised such that a casual observer may not realize that an embodiment is a cabinet or storage unit. This may add to the security of the storage. For example, the entire front face of the cabinet may be a piece of mirrored glass, or it may be a framed mirror, leaving the function as a storage unit not clear. The front and sides, however, need not be limited to mirror decoration, and may have any type of decorative or non-decorative covering, and such covering may be combined with or on top of a mirror.

The locking mechanism may be varied in various embodiments. A typical locking mechanism will include a keypad, perhaps with just ten keys, one for each number digit. But other keypads are possible, including keypads with fewer or more than ten keys, such as a keypad with just five or six numbers, or one with twelve buttons like a phone including "*" and "#". The keypad may include an "Enter" button or may even include a full alphabet of keys similar to a computer keyboard. The locking mechanism may also include an element that isn't a button, such as a dial that is turned before and/or after entering a code into the keypad. The keypad may function purely mechanically, or may be electronic, or a combination of electronic and mechanical.

The locking mechanism may be mounted in various places, including on the side of the cabinet, possibly facing to the side. A side-mounted keypad may be hidden by decorative (or functional) elements mounted on the cabinet. The locking mechanism may also be hidden inside the cabinet. In one hidden embodiment, a keypad can slide out from the side of the cabinet, ordinarily leaving the keypad hidden inside the cabinet. This may be useful both where the cabinet is thin, and where it is preferred for the keypad to face the front instead of facing to the side of the cabinet. Another hidden embodiment may include a mirror touch screen keypad that includes a touch pad embedded or behind the mirror glass. A mirror touch screen keypad may be ordinarily invisible (looking like a plain mirror) when inactive, but when activated, a keypad can appear behind or in the mirror. Touch sensors in the mirror could be used to activate the keypad and separately to accept a combination of entered digits by sensing where a finger touches the mirror glass.

The locking mechanism may also be activated by a keypad or similar device that is not part of the mirror. For example, the locking mechanism may be in wireless communication with an application on a smartphone or similar type of wireless device that allows a user to activate and deactivate the lock through use of the application. The user may open the application on their wireless device and press a button to activate the locking mechanism and likewise press a button or enter a code to deactivate the locking mechanism. Further security could be utilized through encryption of the transmitted deactivation signal to present unauthorized access.

A secure access mirror may other have additional features not normally found in a safe beyond simply the discrete appearance and an integrated mirror. The interior of a secure access mirror may, for example, provide electrical power to electronics that are stored inside the secure cabinet. Laptops, cell phones, and music players, for example, can be charged while also being safely stored. A touch-sensitive mirror may, beyond simply accepting a combination, include a full smart display. A smart display can be a fully interactive computer display with input options such as a touchscreen interface, a fingerprint reader, a camera, and voice input. Such a smart display may disappear behind the mirror when not active, and may become active, for example, when the mirror is touched in a certain spot, when the camera recognizes a face or a certain face, or when the voice input detects an enabling phrase. When inactive, the mirror may appear to be simply a mirror without any noticeable electronics behind it.

The SAM cabinet may also have multiple locking mechanisms, or a single locking mechanism with multiple access codes. Such multiple locks or access codes enable use by multiple people. Access by different people can be tracked, for example, electronically, if desired. Multiple locks or access codes may also unlock different compartments, where, for example, one access code unlocks the middle and right compartment, while a second access code unlocks the middle and left compartments.

The front of an SAM may have camera, in addition to a possible camera inside the cabinet. The front camera may be used for additional security purposes, and may also be used as a computer input for interactivity. The camera may be a still picture camera or a motion or video camera. The camera may be include sensors for human visible spectrum, and may include sensors outside human visible spectrum such as infrared. An illumination source can be included to assist the camera sensor, and may include infrared light source. The front camera sensor may be connected to a facial recognition means for recognizing human faces. Upon recognizing a certain human face or faces, the deadbolt or locking mechanism may unlock to open the cabinet. Alternately, upon recognizing a certain human face, a keypad may become revealed or enabled for entering a combination to unlock the cabinet.

FIG. 1 is a three-dimensional view of an example secure access mirror. Secure access mirror (SAM) 100 includes a shell 102 made of sturdy materials and, in this example, includes at least a back and four sides. Mounted inside the shell are several shelves 144 for holding items for secure storage inside the shell when it is closed. Shelves 144 are depicted as flat horizontal glass shelves each lighted with LED lights. However, other types of supports or containers are possible for holding certain types of items or special shapes of items, for example, a gun holder, jewelry holder, a file for paper documents, or a self-winding wristwatch auto-winder. The stored contents are secured in part by closing shell door 104 and engaging a locking mechanism. The shell door 104 may be of a sturdy material similarly to that of the shell 102. The locking mechanism as depicted here includes a deadbolt 109 on the shell door 104, a lock harness 108, and a keypad 112 on the front face of the shell door for entering or setting a combination for locking and unlocking the deadbolt 109. Possible alternates to the keypad include a combination dial, fingerprint reader, or a camera with face recognition. A keypad or other locking mechanism may be located at a position possibly near the center of the door to meet the requirements of the Americans with Disabilities Act (ADA).

SAM 100 may include additional features for a safe, including camera 114 with a motion sensor, and universal plug outlets 124. When shell door 104 is opened, pressure switch 136 is opened, which can trigger electronics inside the SAM shell, such as turning on any lighting, including the LEDs in the lighted shelves, and triggering the camera 114. Camera 114 can provide additional security by capturing still or motion video whenever the shell 104 is opened, or when motion is sensed, or when any stored item is added or removed from the cabinet. Item adding or removal can be sensed, for example, by pressure switches on or in supports, shelves, or other containers, such as shelves 144, inside the shell 104.

As depicted in FIG. 1, SAM 100 also has a mirrored door 106 that closes in the opposite direction (from left to right) as compared to the shell door 104 (closes from right to left). The mirror on the outside surface (not depicted in FIG. 1) of mirrored door 106 has an aesthetic effect of hiding the possibly heavy and aesthetically unappealing shell 102 and shell door 104 from view when closed. The mirrored door 106 also has the functional effect of added security by hiding the shell 102 and shell door 104. In such a two-door embodiment, the outer mirrored door 106 can be thin compared to the sturdy shell door 104, adding to the aesthetic and functional hiding effect of the mirror. Alternate embodiments are possible, such as a one-door design (not depicted) where, for example, a mirror is affixed directly to the shell door. In a single door design, a keypad can be hidden, for example, on the side of the shell, or by use of a touch-sensitive mirror keypad in the mirror itself.

Figure 2:
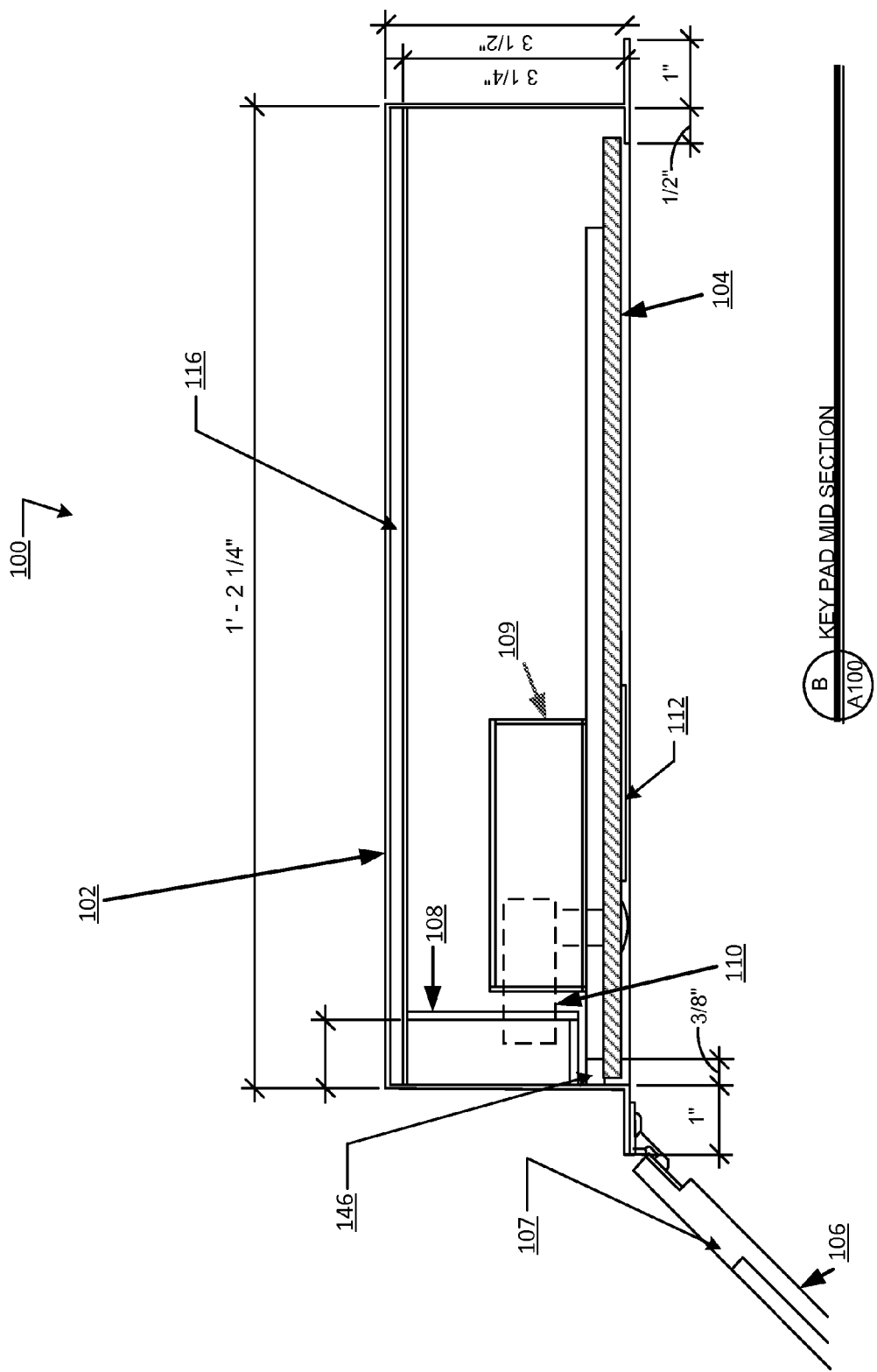
FIG. 2 is a cross-sectional view of the mirror of FIG. 1 taken horizontally though the mid-section of the example secure access mirror.

FIG. 2 is a horizontal cross-sectional view though the mid-section of an example secure access mirror. In the embodiment, SAM 100 with shell 102 has shell door 104 depicted as being closed, and the deadbolt 109 depicted as being locked with bolt 110 engaged in the lock harness 108. Mirrored door 106 is open. Keypad 112 is used to lock or unlock the deadbolt 109. Shell 102 has a false back 116 to hide elements such as wires in a wire chase that, for example, connect to lighted shelves 144 or camera 114. Shell door 104 may include a full length door seal 146, which may be intumescent (such as PALUSOL) to provide protection from fire by swelling when exposed to heat. All dimensions depicted are exemplary; embodiments with alternate dimensions may be possible.

Figure 3:
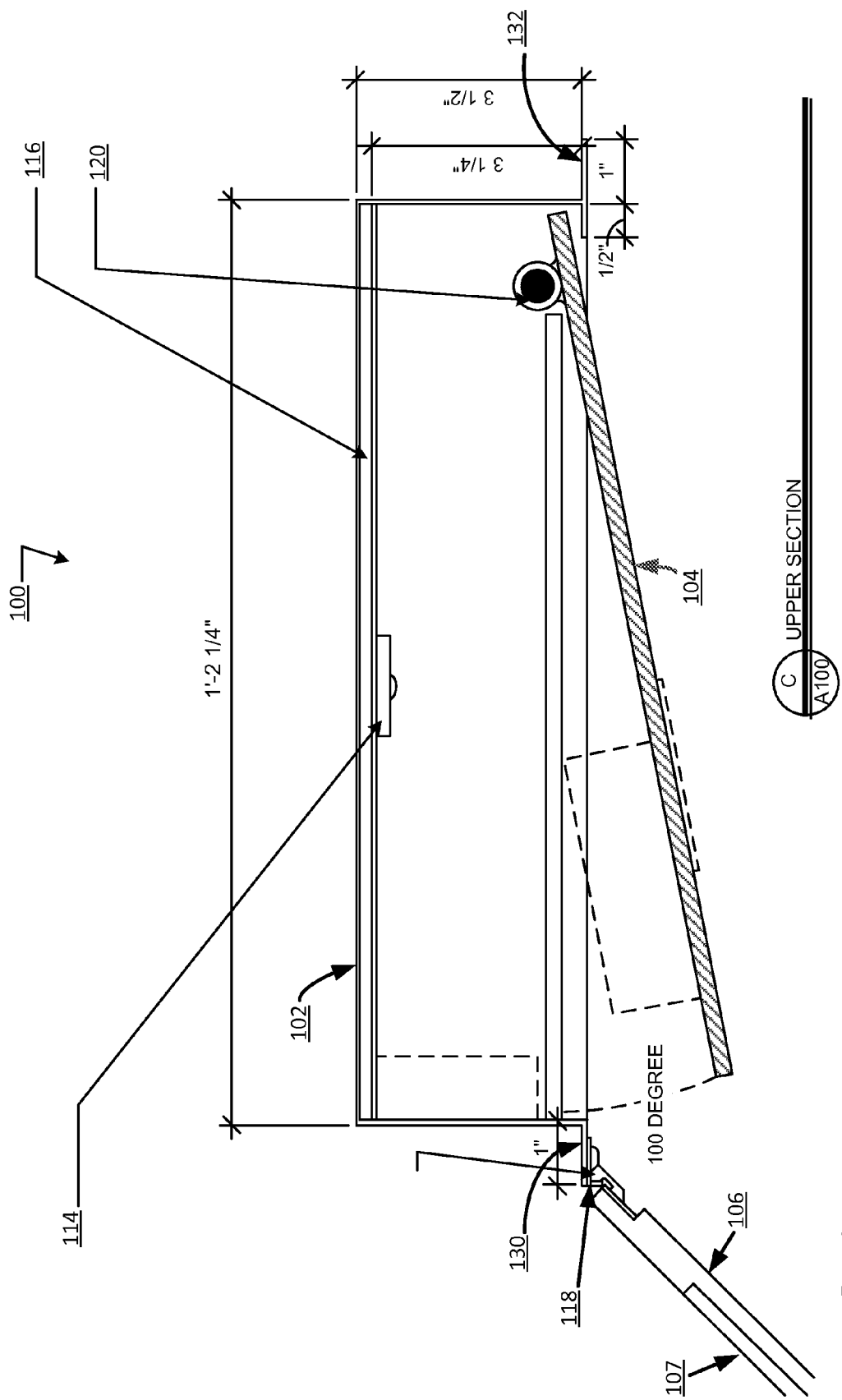
FIG. 3 is a cross-sectional view of the mirror of FIG. 1 taken horizontally though an upper section of the example secure access mirror.

FIG. 3 is a horizontal cross-sectional view though an upper section of an example secure access mirror. FIG. 3 is similar to FIG. 2, but shows an upper portion of SAM 100, including camera 114, which may be in communication with an alarm or security system and could be used to activate an alarm under certain circumstances, and a steel bolt hinge 120 on shell door 104. Mirrored door 106 includes mirror 107 on its front face, and is attached to the left flange 130 of shell 102 with counseled hinges 118. Left flange 130 and right flange 132 enable mirrored door 106 to more completely hide the shell door 104 as well as assist in a flush mounting in a wall, as further depicted in FIG. 5, described below.

Figure 4:
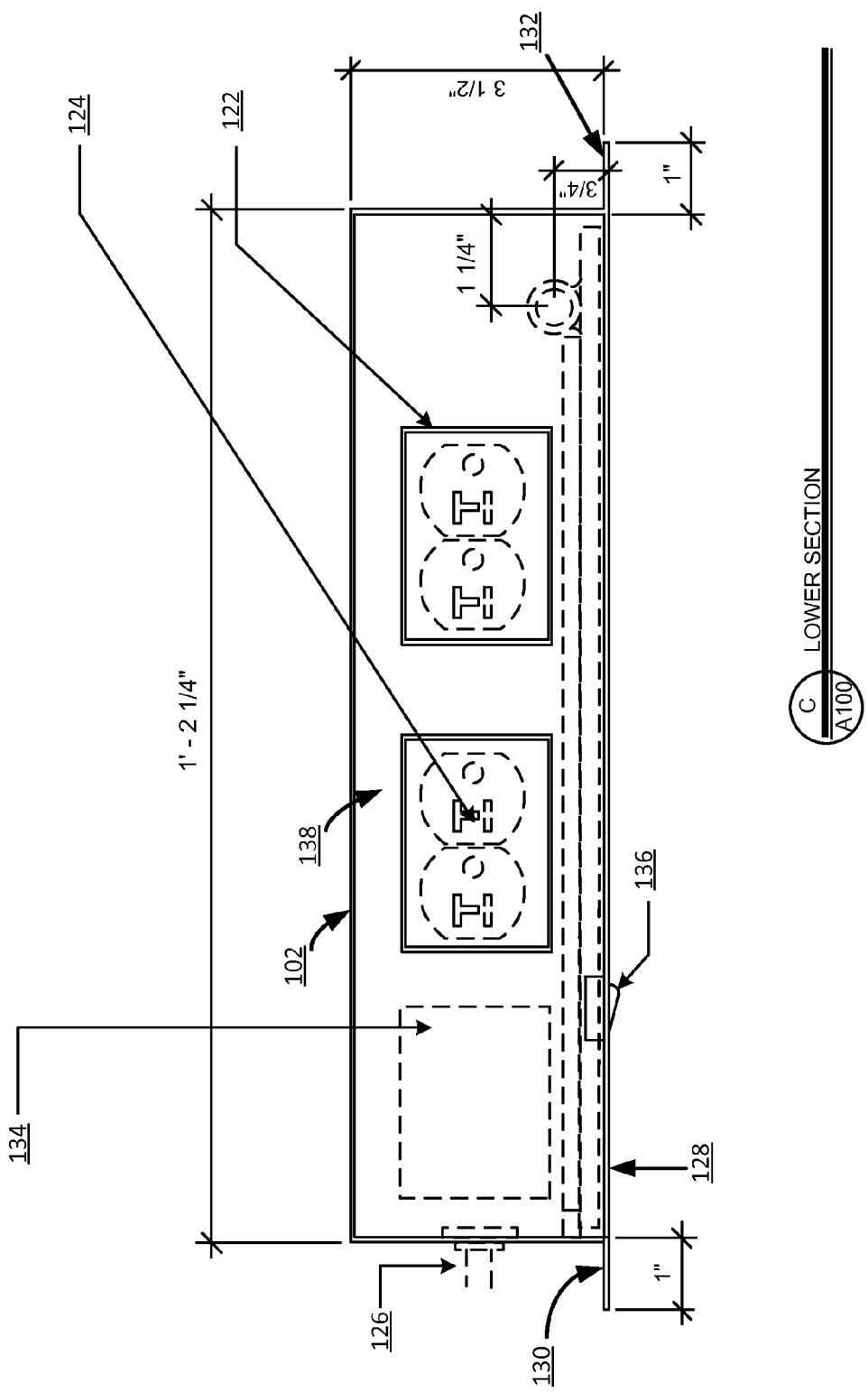
FIG. 4 is a cross-sectional view of the mirror of FIG. 1 taken horizontally though the lower section of the example secure access mirror.

FIG. 4 is a horizontal cross-sectional view though the lower section of an example secure access mirror. In this lower cross-section, two junction boxes 122 are depicted with universal charger and universal serial bus (USB) ports. Any manner of electrical power plugs can be used here, but preferably standardized plugs for providing power to electronic devices stored within the SAM 100. Computer network plugs may also be provided here, such as wired Ethernet and fiber optic computer network connections. SAM 100 may include a false bottom 138, within which the junction boxes are mounted. Additional facilities, such as backup battery 134 for the camera 114 can be hidden below the false bottom 138. An external electrical connection 126, as depicted behind left flange 130, may provide electrical power from outside SAM 100 to electronics inside SAM 100. Additional external wired connections, such as computer network connections, are not depicted but may also be facilitated.

Figure 5:
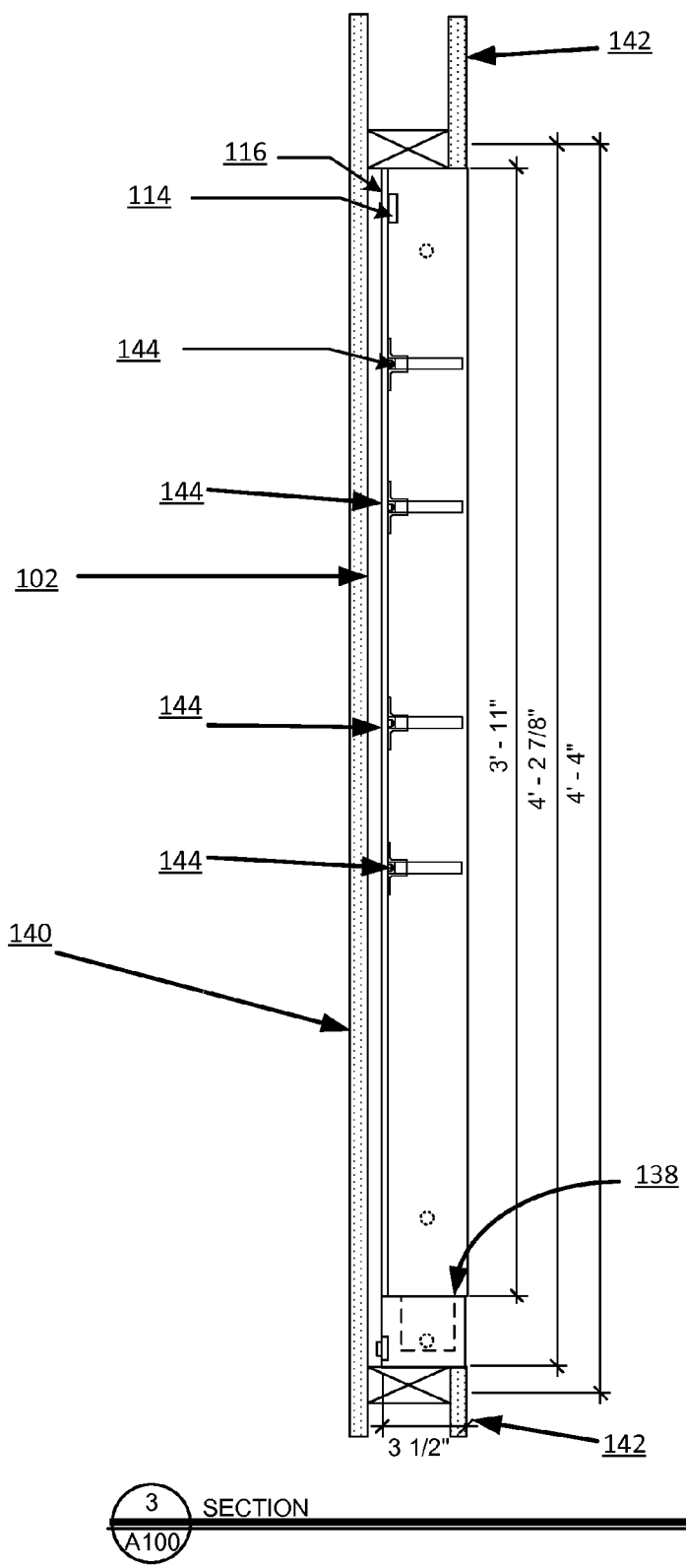
FIG. 5 is a cross-sectional view of the mirror of FIG. 1 taken vertically though the example secure access mirror.

FIG. 5 is a vertical cross-sectional view though an example secure access mirror. In this figure, shell 102 is mounted within wall 142, such that the left and right flanges 130 and 132, respectively, are substantially flush with the wall 142. The back of shell 102 may be further mounted and secured to framing inside the wall 142. False wall 116 may hide a wire chase behind shelves 144. Shelves 144 may be lighted to allow access, for example, at night when installed in a bedroom or hotel room without requiring room lighting to be on. This may help prevent waking another person in the bedroom when accessing the SAM 100 contents. A lighted keypad or lighted touchscreen mirror may further assist in this scenario to allow access without other room lights being on.

Figure 6:
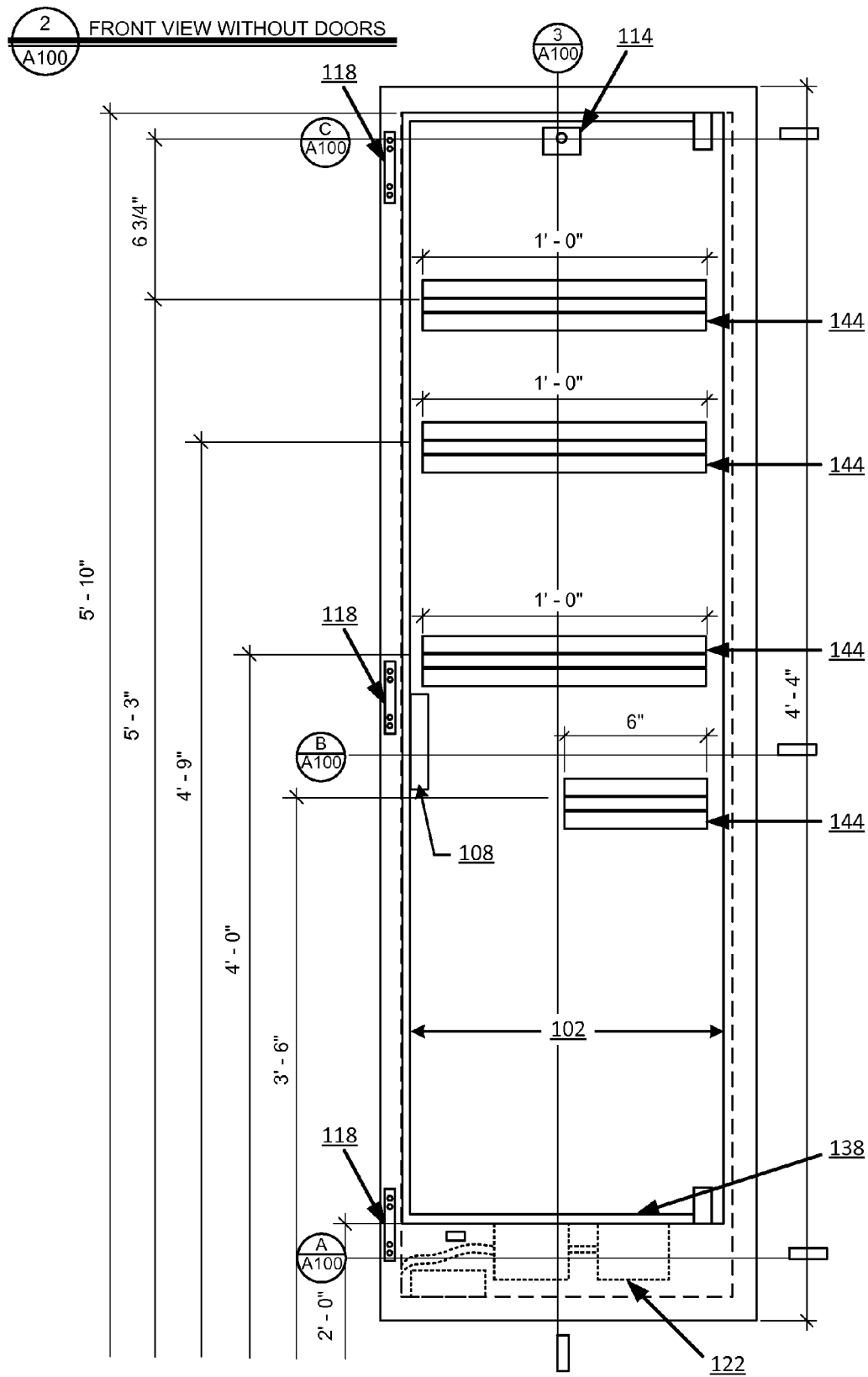
FIG. 6 is a front view of the example secure access mirror of FIG. 1.

FIG. 6 is a front view of an example secure access mirror. Shell 102 may have shelves 144 mounted inside on the false back, and electronic facilities below false bottom 138 may include two junction boxes 122. In the embodiment, three hinges 118 for the mirrored door 106 are depicted.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed:
1. A locking cabinet comprising:
   a shell having high-strength material and at least one aperture, and configured to contain at least one electronic device;
   a shell door attached to the shell and covering an aperture, and having high-strength material and;
   a locking mechanism configured for locking the shell door closed;
   a mirror at least partially covering and concealing the shell door;
   a mirror touch screen keypad within the mirror configured to accept a combination for locking or unlocking the locking mechanism; and
   an electric power source inside the shell configured to provide electric power to the at least one electronic device when the shell door is closed.
2. The locking cabinet of claim 1, wherein the mirror is mounted on the shell door.
3. The locking cabinet of claim 1, further comprising an outer door covering the shell door; and wherein the mirror is mounted on the outer door.
4. The locking cabinet of claim 1, further comprising at least one glass shelf lighted by a light-emitting diode (LED) light.
5. The locking cabinet of claim 1, wherein the locking mechanism includes a keypad configured to accept a combination for locking or unlocking the shell door.
6. The locking cabinet of claim 5, wherein the mirror touch screen keypad is embedded in the mirror, and wherein the mirror touch screen keypad illuminates from within the mirror when the keypad is active and is hidden behind the mirror when the keypad is inactive.
7. The locking cabinet of claim 1, additionally comprising at least one false wall inside the shell configured to conceal wiring.
8. The locking cabinet of claim 1, additionally comprising: an inner camera operable to capture one or more images of a user while the shell door is opened.
9. The locking cabinet of claim 8, wherein the inner camera is configured to capture the one or more images in response to a sensor indicating the shell door is opened.
10. The locking cabinet of claim 8, further comprising a front camera on the front of the locking cabinet and operable to capture one or more images when the shell door closed.
11. The locking cabinet of claim 10, wherein the front camera is connected to a system for human facial recognition.

12. A locking cabinet comprising:
a shell having high-strength material and at least one aperture, and configured to contain at least one electronic device;
a shell door attached to the shell and covering an aperture, and having high-strength material;
a locking mechanism configured for locking the shell door closed;
a mirror mounted on the outside of the shell door;
an electric power source inside the shell configured to provide electric power to the at least one electronic device when the shell door is closed;
at least one glass shelf lighted by a light-emitting diode (LED) light; and
a mirror touch screen keypad configured to accept a combination for locking or unlocking the locking mechanism, wherein the keypad illuminates from within the mirror when the keypad is active, and the keypad is hidden behind the mirror when the keypad is inactive.

13. A locking cabinet comprising:
a shell having high-strength material and at least one aperture, and configured to contain at least one electronic device;
a shell door attached to the shell and covering an aperture, and having high-strength material;
a locking mechanism configured for locking the shell door closed;
a mirror mounted on the outside of the shell door;
an electric power source inside the shell configured to provide electric power to the at least one electronic device when the shell door is closed;
a mirror touch screen keypad configured to accept a combination for locking or unlocking the locking mechanism, wherein the keypad illuminates from within the mirror when the keypad is active, and the keypad is hidden behind the mirror when the keypad is inactive.

14. The locking cabinet of claim 8, wherein the inner camera is further configured to capture the one or more images in response to a sensor indicating an item is added to or removed from the locking cabinet.

15. The locking cabinet of claim 8, wherein the inner camera is further configured to capture the one or more images in response to a sensor indicating motion.

\* \* \* \* \*